United States Patent [19]

Templeton et al.

[11] Patent Number: 5,226,370
[45] Date of Patent: Jul. 13, 1993

[54] TRANSIT CAR DOOR SYSTEM AND OPERATION

[75] Inventors: Frederick E. Templeton, Boise, Id.; Robert F. Carter, Arkport, N.Y.; David L. Crawforth, Boise, Id.

[73] Assignee: Morrison Knudsen Company, Boise, Id.

[21] Appl. No.: 858,516

[22] Filed: Mar. 27, 1992

Related U.S. Application Data

[62] Division of Ser. No. 333,703, Apr. 5, 1989, Pat. No. 4,981,084.

[51] Int. Cl.$^5$ .............................................. B60N 5/00
[52] U.S. Cl. ..................................... 105/341; 318/480
[58] Field of Search .............. 105/341; 49/26, 28, 49/29, 31; 318/661, 602, 652, 480

[56] References Cited

U.S. PATENT DOCUMENTS

| | | | |
|---|---|---|---|
| 3,239,741 | 3/1966 | Rank | 318/480 |
| 3,510,742 | 5/1970 | Pooley | 318/480 |
| 4,460,857 | 7/1984 | Michaelis | 318/480 |
| 4,511,797 | 4/1985 | Pohlig et al. | 318/480 |
| 4,698,567 | 10/1987 | Gottwald et al. | 318/480 |
| 4,816,728 | 3/1989 | Kurakake | 318/480 |
| 5,065,081 | 11/1991 | Shah | 318/480 |

Primary Examiner—Mark T. Le
Attorney, Agent, or Firm—Raymond N. Baker

[57] ABSTRACT

A computer assisted transit car door operating system for augmented automation of transit car door panel operation while providing safety provisions to restrain rail movement unless all passage doorways are closed. A programmable logic controller generates a sequence initiating (opening or closing) signal for a door panel; or, a manual input signal can be introduced for such purpose. The controller receives signals from a panel position sensor and a panel movement sensor to evaluate door panel status and generate status indication and panel movement signals. Automated control of door panel movement is selectively directed to a doorway, or doorways, at which an opening or closing problem is being encountered; that is, the exclusion of door panel movement signals to properly operated door panels. An electrical cam device utilizes a radiant energy emitter and detector with a reversible-direction, coded attenuator, keyed to a reversible-direction motor drive for a door panel; modulating output of such radiant energy detector indicates direction of movement and other data by coordination with the controller. An electrically controlled power regulator controls connection of a source of DC power to control direction of rotation of a reversible-rotation DC motor controlling opening and closing of door panel.

5 Claims, 11 Drawing Sheets

TRANSIT CAR DOOR SYSTEM AND OPERATION

This is a division of application Ser. No. 333,703, filed Apr. 5, 1989 now U.S. Pat. No 4,981,084, the entire disclosure of which is incorporated herein by reference.

This invention relates to automated supervision of transit car door operation for improving passenger safety and increasing reliability of transit car door operations.

More particularly, this invention is concerned with concepts providing for a more durable, economical and reliable system for operating transit car doors. In addition, specific electrical devices are provided for evaluating and controlling the mechanical output of reversible motor drives for use in such transit door systems.

For safety purposes, all passenger boarding doorways should be closed in order to permit rail movement; and, such doors should normally remain closed until arrival at a station platform for exit of transit car passengers. The present invention makes these safeguards readily available and readily enforceable in an automated manner.

The conductor for a transit car, or for a train (usually about ten interconnected transit cars), has the responsibility for verifying closure of all passenger car doors. In prior systems, the conductor has been responsible for manually initiating and completing door closing or opening movements. The present invention automates supervision of door movements subsequent to an initiating door movement signal; and/or also provides for generating initiating door movement signals responsive to sensed conditions.

Typically, subway transit cars have an elongated configuration with three to four doorways for boarding or exiting on each longitudinal side of a car. Two sliding door panels are often used cooperatively to close each doorway. The number of door panels subject to obstruction, or other fault, is thus multiplied. Locating an individual door panel which has not closed, or a doorway at which closing difficulty is being experienced, is an important contribution of the present system.

Further, with long established subway car door systems, items, such as a passenger's arm or article of clothing, could be caught between two sliding door panels notwithstanding that such door panels were indicated as "closed." The present system substantially eliminates such risks by detecting, differentiating, correcting and/or indicating such a fault for door operation purposes.

Also in such prior systems, the conductor, in attempting to correct an obstructed doorway problem, was limited to door re-opening and attempted reclosing operations for all door panels on the same side of the transit car or the train. Re-opening multiple doorways during passenger rush hours tends to develop other doorway obstruction problems as passengers move to enter all doors again. This tended to increase hazards to safety and cause delays.

Thus, the importance of the contribution of the computer-assisted, electronically-controlled door operating system embodiment of the invention which locates and identifies an individual doorway obstruction or a door panel problem. With such identification, the programmed logic controller of the present invention concentrates automated remedial action(s) on an identified problem location and eliminates the prior art requirement to reopen other doorway panels which have been closed properly. These features help to provide for safer, more reliable and more economical operation of a car door system.

The above and other advantages and contributions of the invention are described in more detail in relation to the accompanying drawings, in which.

Part of the present invention involves recognition of problems built into and continued in transit car door operating systems such as subway car door systems. The concepts devised for practicable solutions to such problems include automated sensing and location of door obstruction problems and other concepts which enable automated augmentation of supervisory control of door operations.

Figure 1:
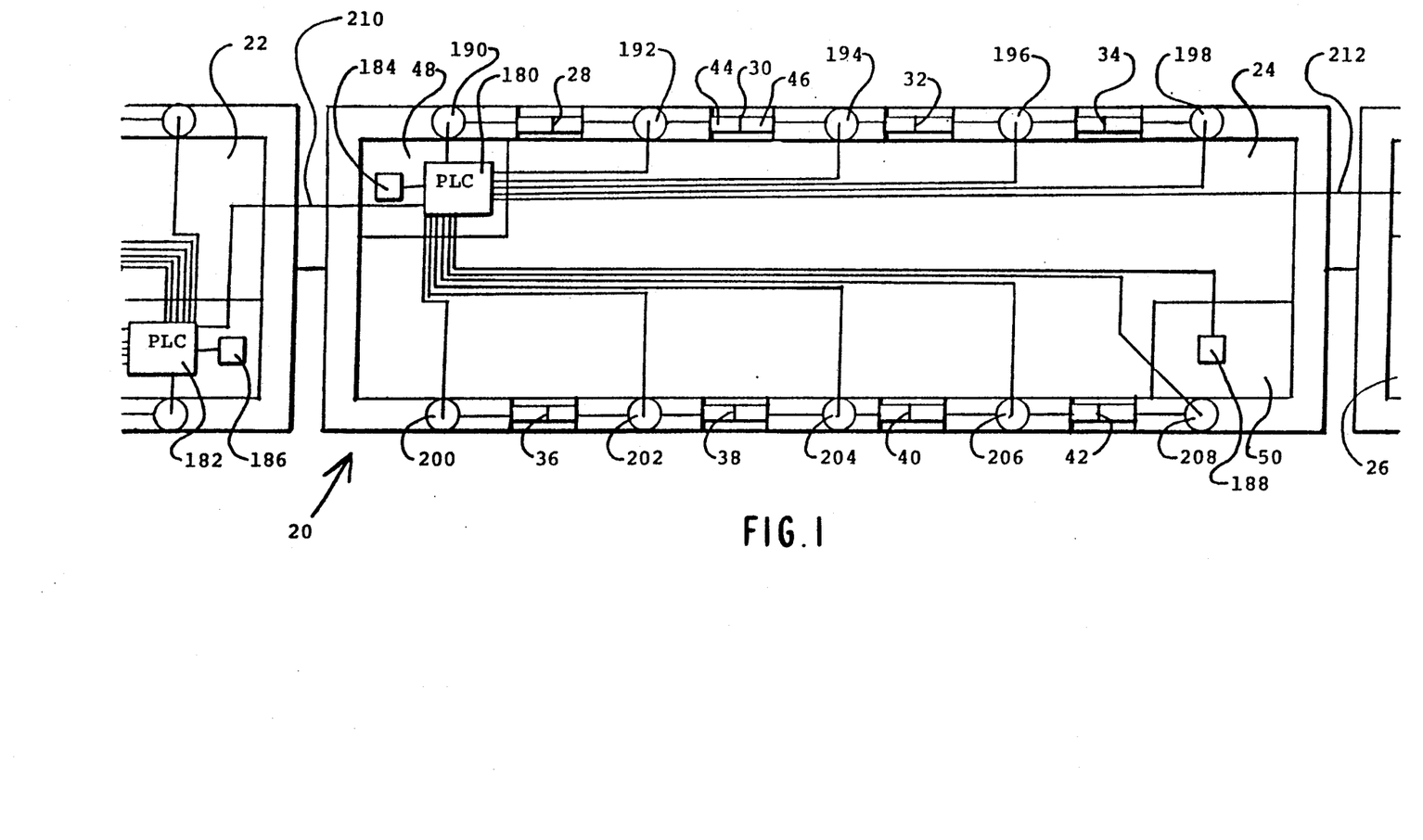
FIG. 1 is a schematic plan view of an embodiment of the invention with a plurality of individual transit cars interconnected in a train.

Referring to FIG. 1, passenger train 20 includes a plurality of elongated transit cars 22, 24 and 26. The number of subway transit cars in a train can generally vary up to about ten. Each car has a plurality of doorways such as 28, 30, 34, 36, 38, 40 and 42 which are in spaced relationship along the longitudinal sidewalls of the car.

In the illustrated embodiment, each doorway includes two panels such as 44, 46 which during opening, slide into recesses in the sidewall of the car. Car cabins, such as 48 and 50 of car 24, are located on opposite sides of the car. Each cabin contains supervisory switch means (not shown) for opening or closing the doors located on the same side of the train as the cabin. Monitoring panels 184, 188 in each cabin indicate the status of all doors along such side.

Figure 2:
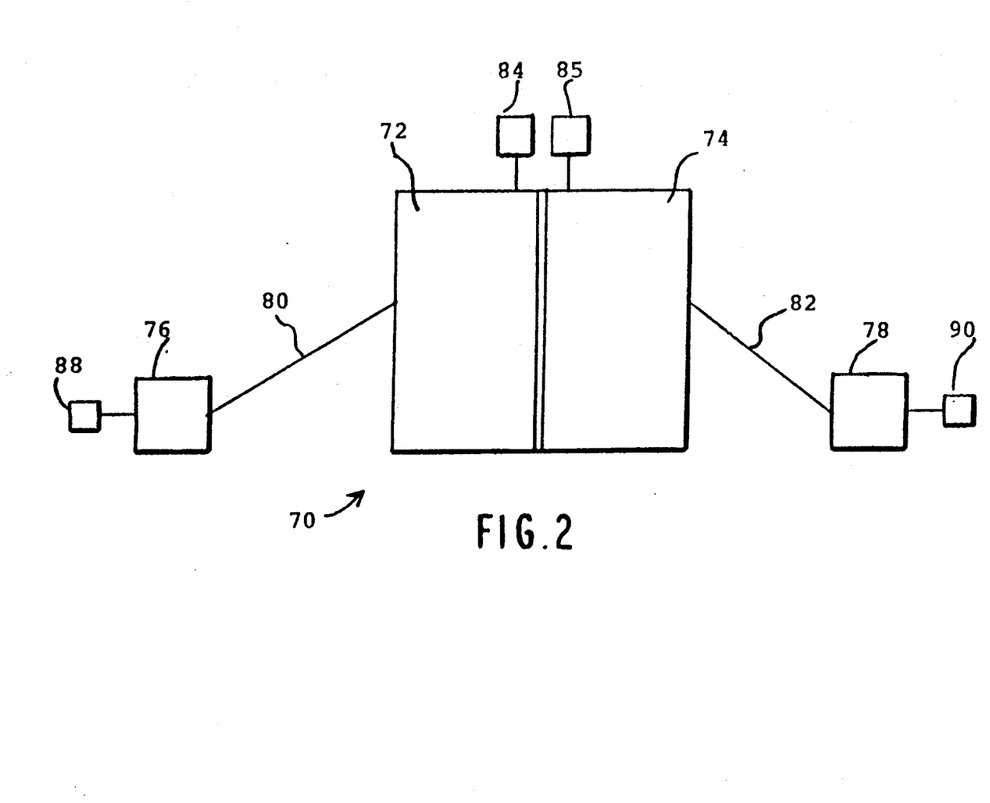
FIG. 2 is a schematic view in elevation of an embodiment of the invention showing sensing and operating means for opening and closing individual car door panels of a transit car doorway.

FIG. 2 is a block diagram with a partial showing of components for a door panel movement system for opening and closing a transit car doorway 70. Sliding door panels 72, 74 are connected respectively to motor drives 76, 78 through mechanical linkages 80, 82. In the embodiment being described two sliding panels open a doorway as each moves into a recess in a transit car side wall on each side of the doorway. Other types of doors could be used with present teachings on automated opening or closing of a doorway.

In a preferred embodiment, the motor drives for door panels comprise DC electric motors with integrated gear boxes; other types of motors could be used.

The mechanical linkage shown converts rotary motion of the motor into linear motion for an illustrated sliding door panel; a motor drive can be mechanically linked to operate two door panels. Various types of suitable connecting rod linkages are known in the art. Also, other mechanical methods of interconnecting a rotary drive to a linear movement sliding door panel could be used, such as a rack and pinion.

A departure from prior practice, and an important characteristic of the present system, is an ability to automatically achieve some classification of a problem; such as being either in the door panel operation itself, or resulting from door operation. And, further, an ability to locate and indicate the location of that fault; and, also to selectively take automated corrective action(s) at such location. Feedback to a programmable logic computer, and between coacting computers in a train, as described later herein, are important to overall coordination of doorway openings and closures in a transit car and throughout a train.

Automated operation is facilitated by use of a plurality of door panel status sensors and programming their combined responses. A position sensor is utilized to precisely indicate door panel closure. Position sensors 84, 85 (FIG. 2) determine whether or not door panels 72, 74 are closed and signal such closure.

In addition, however, sensors 84, 85 help to determine if an item, such as a passenger appendage, is caught between the door panels and/or if there is an attempt being made by incremental prying, of some sort, to force opening of a panel or an opening between door panels.

Automatic door openers, such as the optic or mechanical devices found on elevator door panels are not used. It is considered more practical for rail travel purposes on heavily-used, daily-commuter type trains to avoid such automatic self-openers in the door operating system taught herein.

Crowded daily transit systems have adhered to a spring-loaded "push bar" system, where door panels meet, which enables a door panel movement connector arm to move slightly past its "dead-center" position to assure a locked closure. The vertically-oriented "push bars," extending along the meeting edges of sliding door panels and the spring loading permits the connector arm for each panel to swing past its "dead-center" position into such a "locked" position.

The shortcoming of prior systems was an inability to detect in a timely manner some variance from normal panel closing procedure. As a result, a gap could readily result between door panels in approaching closure; could be sustained while the mechanical linkage was in what would be termed a "locked-closed" position; and, would remain undetected. A major hazard was trapping the clothing or other appendage of a not-yet-boarded passenger in such a gap as the doors closed and the train moved on. In the prior practice a three-inch gap between door panels was possible.

The present system, for passenger safety purposes, restrains car or train movement when any boarding doorway is not properly closed and automates supervision of opening and closing of door panels. The sensing, feedback and programmable logic of the present automated supervision of transit car door operation enables determination of when doors are not properly closed or properly open; as well as not properly closing or not properly opening.

Several measures are undertaken in the present system to provide reliable automated operation which is considered both safe and practical for crowded daily-commuter type transit services.

Position sensors 84, 85 are located so as to accurately minimize a permissible spring-loaded push-bar gap (to about ½ inch) and to indicate that an item may be caught by detecting efforts made to incrementally pry open a panel or panels. A further door panel sensor system, through a programmable logic controller, to be described, is coordinated with sensor means 84, 85 to recognize normal functioning and differentiate possible faults in door panel operation from those, such as obstructions, resulting from door panel operation.

Door panel movement sensors 88, 90 are coordinated with motor drives 76, 78, respectively, so as to determine movement of door panels 72, 74; and through such programmable controller determine direction of movement; and, also, proper movement within a prescribed time to determine normal functioning of a door panel. The timing of the latter is coordinated with the position sensor (84 or 85) signal so as to indicate a closure or opening of a door panel without impediment or fault; that is, which was not impeded by a passenger, did not trap any item, had not mechanical malfunctioned, etc.

A novel combination of elements, shown and described in relation to a later figure, is provided to carry out such novel evaluations of door panel operation.

Figure 3:
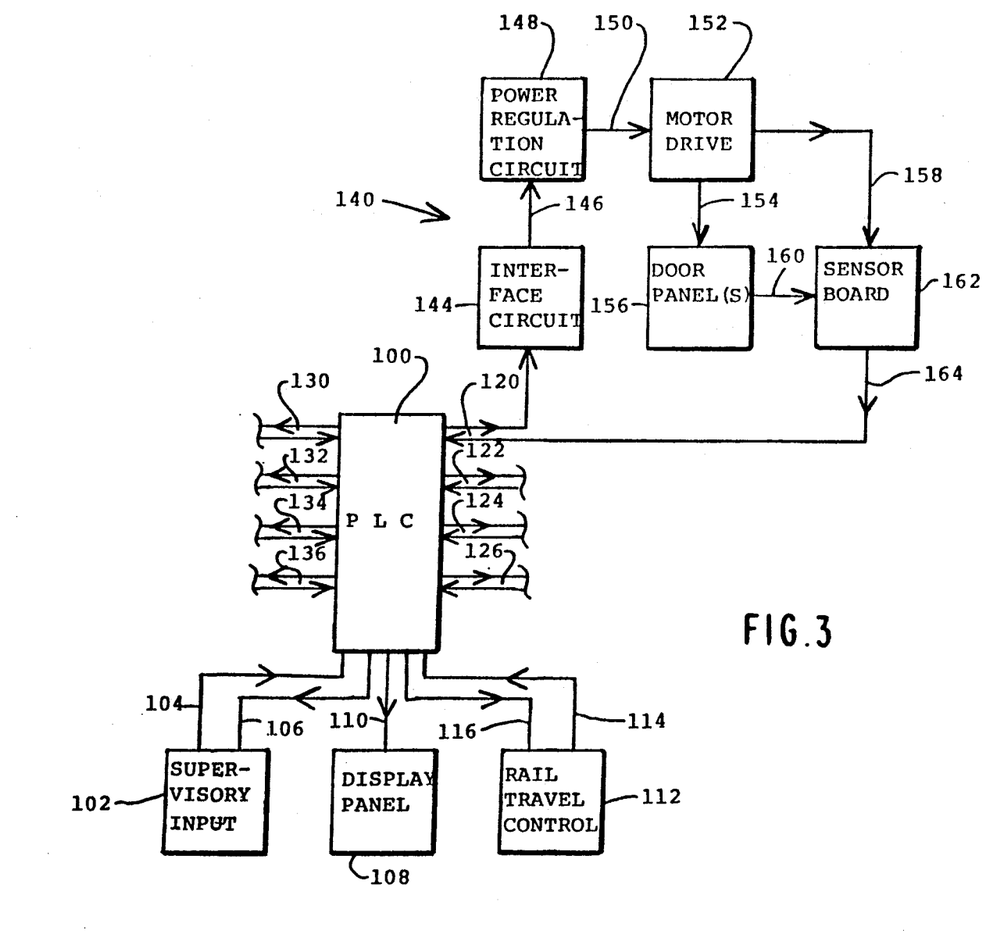
FIG. 3 is a block diagram for illustrating the closed loop feedback control system of the invention for operating a door panel or mechanically interlinked door panels.

FIG. 3 is a block diagram for illustrating the closed loop feedback to controller means 100 forming part of the invention. In a preferred embodiment, the controller means 100 is a PLC (programmable logic controller), which is configured by a program (described later herein) to perform the previously discussed control functions in response to sequence initiating signals and panel position and panel sensor movement signals.

A supervisory sequence initiating input means 102 can include, for example, a manually operable switch for providing a signal input through wire 104. Sequence initiating and door movement signals are arranged for normal operating purposes to control the doors on only one side at a time of a car and/or train. A supervisory sequence initiating control signal can originate in any control station (cabin) in a train; PLC's throughout a train are interconnected, such as by wires 210 and 212 in FIG. 1, such that passage through all boarding doorways on the same side of the train can be opened by the train conductor from any of such control station cabins located on the same side of the train as such doorways.

Supervisory sequence initiating signals can be provided by a fully automated system which would, for example, read condition sensor signals to determine that a train is properly stopped in a station, then issue sequence initiating signals to permit passengers to exit transit cars of the train, and then provide for closing such doorways and continuing rail movement. Feedback wire 106 could be used for maintaining a proper orientation of a manual input control switch during a fully automated operation.

PLC 100 provides output signals to display panel 108 through wire 110. In a specific embodiment, where supervisory sequence initiating control is provided by manual input of train personnel, a manual input introduced through the PLC is displayed in each cabin in each transit car forming a train. The data available with the present invention for indicating which doors are obstructed or which are malfunctioning can be displayed. And, stored data can be fed back from PLC 100 through conduit 110.

PLC 100 also responds to and provides signals for a rail travel control means 112 through wires 114, 116. As will be further explained with reference to FIG. 8, the rail travel control 112 or travel brake system 598 is connected through the PLCs to the previous and subsequent cars of the train such that the signal can be directly or indirectly connected to the train's system for braking movement along the rail. The PLC in each car will not direct a release signal by 116 to the rail travel control system until input signal 114 is on and all boarding doorways are properly closed.

A controller means in each transit car, such as PLC 100, is connected to door panel control circuitry for each door panel means motor drive in a car (a door panel motor drive can be mechanically linked to one or two door panels).

Such circuitry controls such door panel means motor drive and sends feedback including sensed data in relation to each doorway to the PLC. A PLC could be provided in each control station cabin on each side of a car; but, a single PLC per car can be wired and programmed to separately control doorways on each side of a car, while display and input switch means are provided in each control cabin for the doors on that side of the train on which the cabin is located. Locating a cabin on each side of a car allows the train conductor to better observe conditions on the side of the train which is being used.

Panel connector line 120 is shown in FIG. 3 connected to the illustrated block diagram. Connector lines 122 through 126 are connected to other door panels on the same side of the car; and, 130 through 136 are individual door panels on for the other side of the car. Such connectors comprise a cable of signal wires providing sensed information, motor control signals, and feedback. The system 140 shown in FIG. 3 is connected to the PLC 100 through cable 120.

PLC 100 delivers output signals through cable 120 to an interface circuit 144. Control signals from interface circuit 144 are delivered through connector 146 to power regulation circuit 148. The power regulation circuit is connected to a source of electrical power (not shown in this figure) for controlling power in supply line 150 to, in a preferred embodiment, a DC reversible-rotation electric motor drive 152.

As described later, provision is made for separately controlling current in the armature windings and the field windings for braking purposes; and, for power switching that provides accurate and durable control of the direction of rotation of the motor.

The drive motor includes an integral gear box for delivering rotary output to a linear-movement mechanical linkage 154 for door panel means 156. A single motor drive can be mechanically linked to each door panel; or, can operate two panels on the same side of a car. A single drive motor and single mechanical linkage for each door panel is preferred and, will generally be referred to herein in describing automated control concepts.

Sensor means, as previously discussed, are coordinated with the motor drive 152 by connector 153; and to the door panel means 156 by connector 160. From sensor board 162, connector 164 separately delivers sensed data to PLC 100 for evaluation; and, PLC 100 provides for feedback signals to the motor drive control through interface circuit 144.

FIG. 1, which has been described in part, also illustrates physical layout for interconnecting the PLC in a car to control passage through the various doorways in that car; and, for interconnecting PLC's of the various cars in a train. For example, PLC 180 in the cabin 48 of transit car 24 is connected to a display 184 in the same cabin, to a display 188 in the cabin on the opposite side of the car, and to cables for control signals to the drive motors; the latter are shown as 190, 192, 194, 196, 198, 200, 202, 204, 206, 208 (each motor drive is connected to door panel means comprising either a single or dual door panel, as shown). The train's PLC's are connected in a network by connectors 210, 212 which also represent lines for supervisory control and/or train motion control which run between the transit cars in a train (see FIG. 8 described below).

Figure 4:
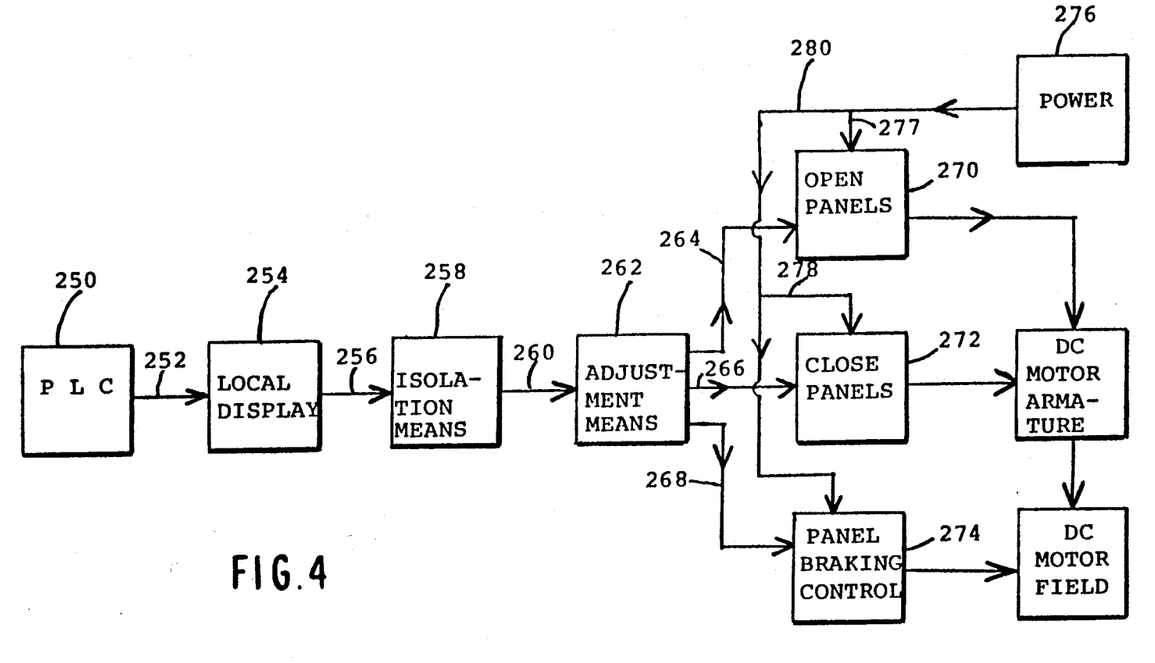
FIG. 4 is a block diagram of a portion of the control circuitry of the invention for operating a door panel or mechanically interlinked door panels.

FIG. 4 is a block diagram presenting functional interrelationship of a PLC and motor drive for control of panel movement. Sequencing and other signals from PLC 250 travel through cable 252 to intermediate means which can include local display, isolation means and power adjustment means. Local display 254 indicates the status of a motor drive; for example, LED's connected to the control wires, which illuminate when a respective signal wire is energized. Local indication provides convenient information during maintenance and testing.

Signals travel via connector 256 to isolation means 258 which protect the PLC from the higher voltages of the power regulation circuit; and, also, protect the power circuit from leakage from the PLC. In a preferred embodiment, optic isolators are used; but, isolation relays or other electrical protective means known in the art could be adapted to this use.

Signals from such protective isolation means through the connector 260 are directed to an adjustment means 262.

The level of power delivered to the motor drive means by the power regulator circuit is advantageously adjusted at signal level.

Drive motor power is established in various traces on a power regulation circuit board connected by cables 264, 266, 268 to circuit components of a power regulation board for panel movement control, such as, opening 270, closing 272, and braking 274 components.

The components for door opening and closing are connected to a source of power 276 by connectors 277, 278 from power line 280. The power regulator switching means controls power between the power source and the armature and field windings of a reversible-direction DC motor to control opening or closing movement of the drive and door panel means.

Figure 5:
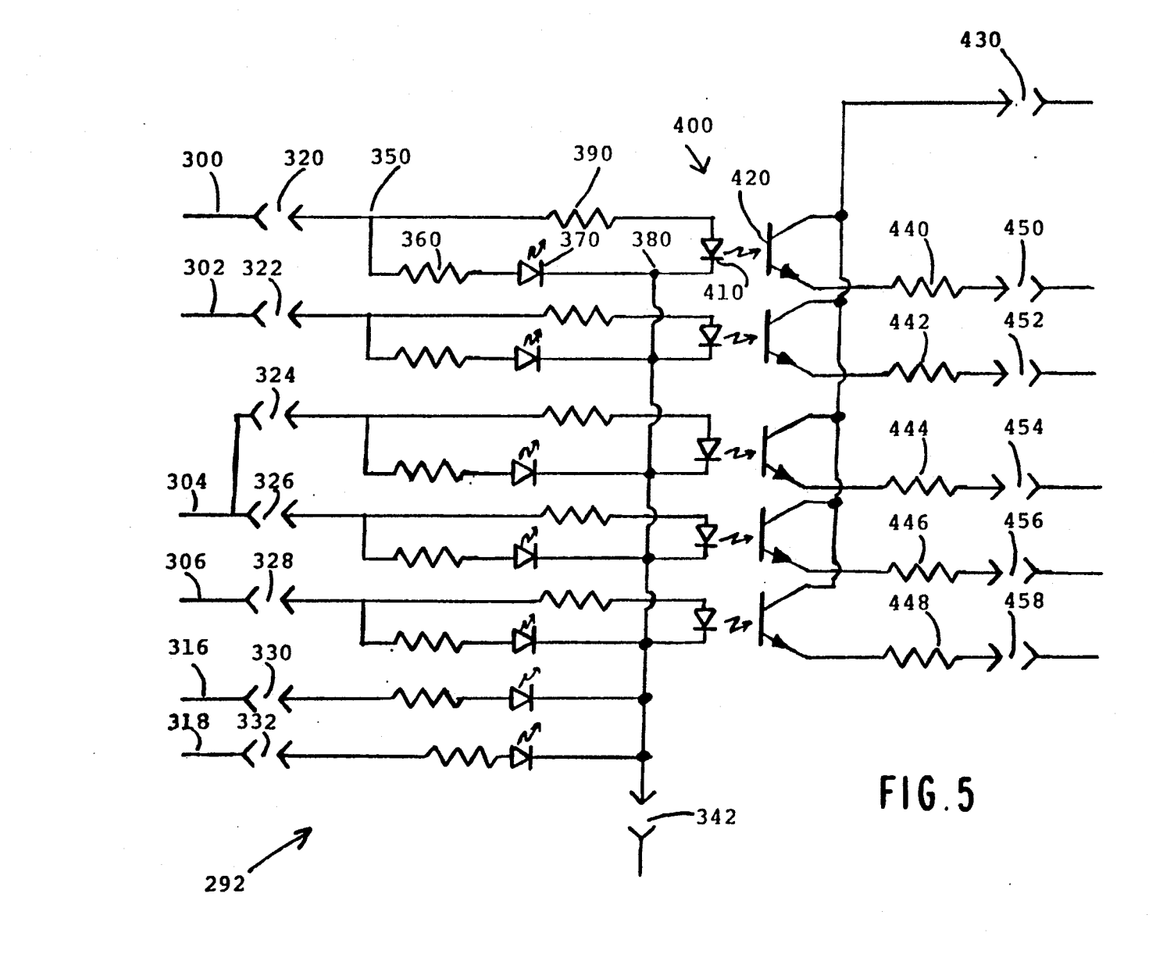
FIGS. 5, 6 and 7 are components to be interconnected in a circuit diagram of a specific embodiment of the invention with power switching means for reversible motor drive operation of a door panel or mechanically interlinked door panels.
Figure 6:
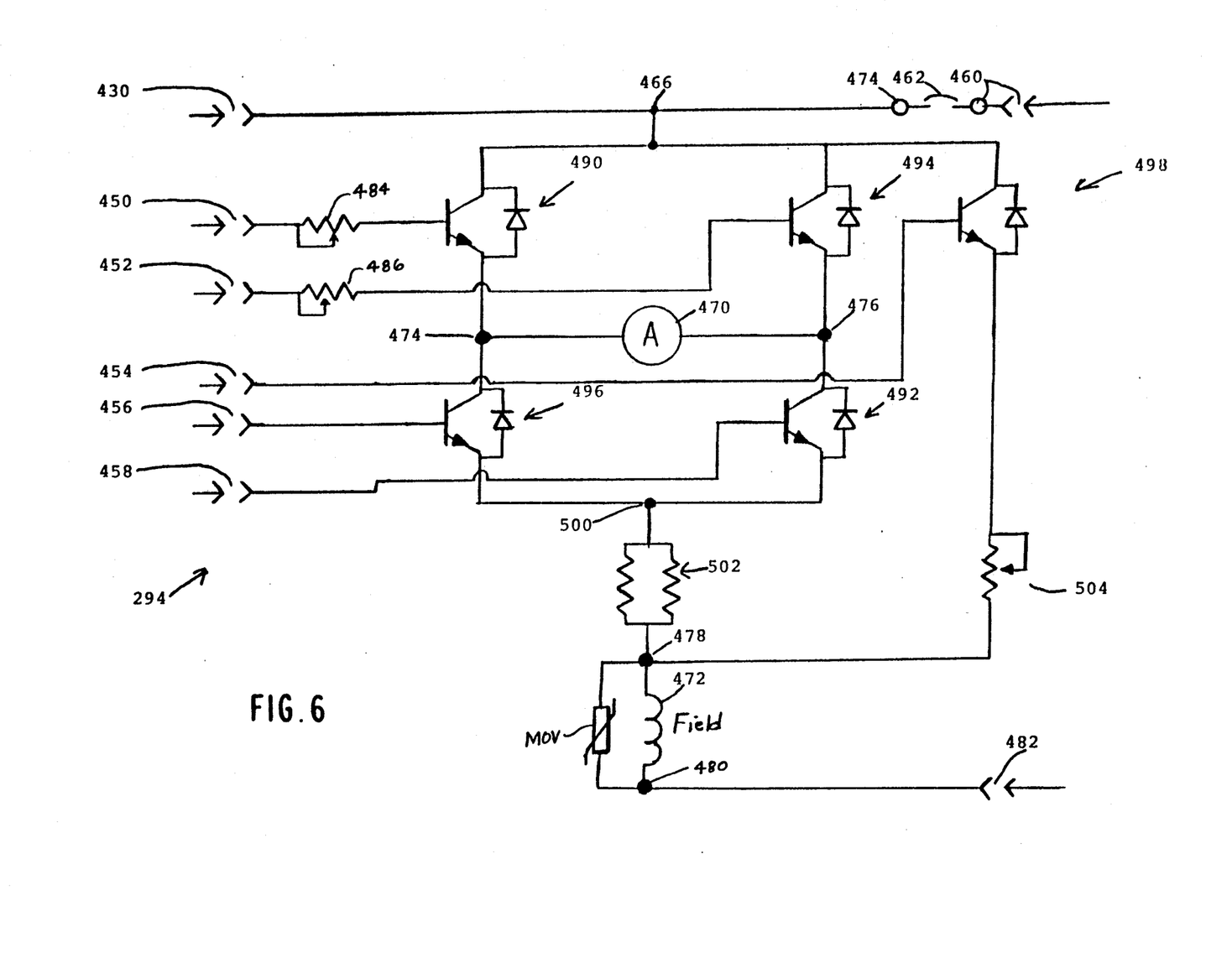
Figure 7:
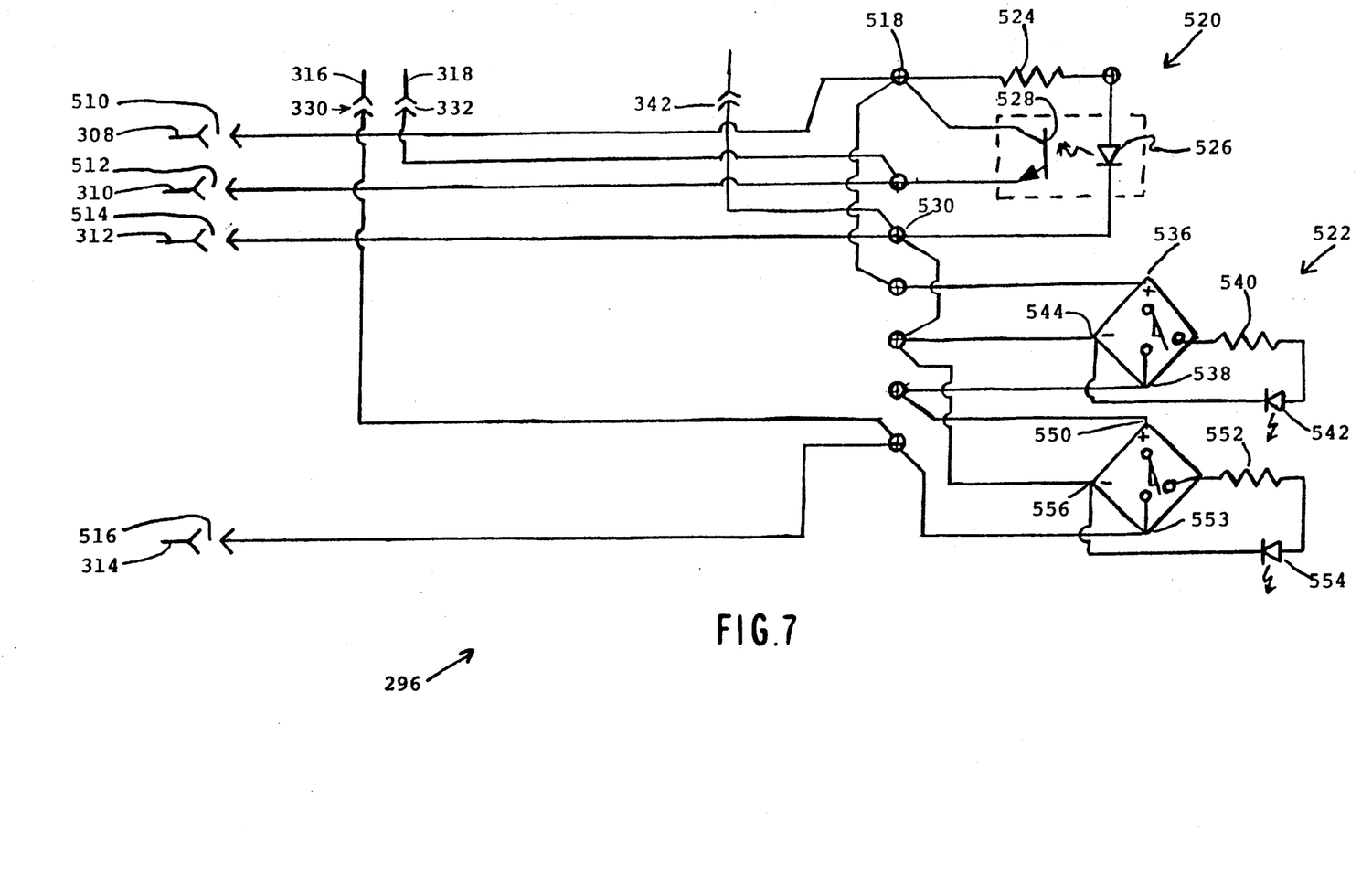

FIGS. 5, 6 and 7 present the major segments to be interconnected in a circuit diagram to provide a specific embodiment of signal and power control for a motor drive. The electrical control means for each motor can be divided by function into three circuits or circuit boards, namely an interface circuit 292 of FIG. 5 between a PLC and a power regulation circuit 294 shown in FIG. 6; and, a panel sensing circuit 296 shown in FIG. 7.

Door panel movement signals from the PLC (not shown) are directed through signal wires 300, 302, 304, 306 to interface connectors 320, 322, 324, 326, and 328, as shown. Signal wire 300 transmits only the "open"

signal for a specific panel; while wire 306 transmits the "open" signal for all the drive motors of the car door panels to be opened. Both such "specific" door panel signal and such "common" signal must be "on" before a specific door panel will open.

Connector 304 transmits a "close" signal for a specific door panel; and, connector 302 transmits the "close" signal which is common for all motor drives for car panels to be closed. Both signals must be "on" for a specific door panel (or dual panels which are mechanically linked) to close.

Such division and utilization of a "specific" panel signal and the "common" signal for all doorway panels of a transit car, facilitates selective allocation of panel movement signals to problem areas, as discussed earlier, which enables automatic exclusion of re-opening and re-closing signals to panels of a doorway which has been properly closed; or properly opened.

Also, in a specific embodiment, signal wire 304 is connected to two separate connectors (324, 326) of the interface circuit 292. Signal wire 304 is used to carry both a "specific" panel means "close" signal and, a braking control signal for that motor drive.

Signals are also directed to the interface circuit 292 from the panel sensing circuit 296 of FIG. 7 through wires 316, 318 to connectors 330, 332 which connect to the interface circuit. The interface circuit provides local status indication near the motor drive. The ground connector 342 used by the interface circuit also is directed from the panel sensing circuit (of FIG. 7).

Local indication is provided by the same mechanism for each signal connection to the interface circuit. However, there is no signal indication for the common ground connection 342. Each such interface circuit connection is, typically, connected as shown for connector 320; that is, the signal trace is connected at node 350 to an indication trace and current is established through a 2.2 K-ohm resistor 360 which limits the indication current; and, the current for LED 370 is connected to the common ground 342 at 380. A 2.2 ohm resister is used in each line; and, the same type of LED is used in each.

Isolation at the interface circuit input is provided by the same mechanism for each motor control signal trace in the interface circuit. Signal isolation for connector 320 is typical for each of motor control signal connections. Connector 320 is connected through resistor 390 (resistance value 750 ohms) which is used to limit the current. In the circuit illustrated, an optic isolator 400 includes LED 410 connected to ground 380 and an optically-responsive transistor 420 connected to a signal voltage level (22 volt) power line established at connector 430. The power used by the optical isolator 400 to generate the control signals for the power regulation circuit comes from connection 430 in the line to the power source.

An optic isolator device combining an LED and optically-sensitive transistor, such as 400, can be purchased from known suppliers or made from discrete components in a known manner. A suitable optic isolator device for the specific embodiment is the Phillips ECG 3045, available from Phillips ECG, Inc., 1025 Westminster Drive, P.O. Box 3277, Williamsport, Pa., 17701.

Current through transistor 420 in the optic isolator (400) is limited by resistor 440; connector 450 connects the interface circuit 292 and the power regulation circuit (board) 294 of FIG. 6. Resistors 440, 442, and 444 for the "specific-open," the "common-close," and the panel braking signals, respectively, each have a resistance of 56-ohm. The resistors 446 and 448 for the "common-open" and "specific-close" signals, respectively, each have a resistance of 620 ohms.

In the power regulation circuit 294 of FIG. 6, the motor drive control signals enter at connectors 450, 452, 454, 456, and 458. The power regulation circuit is connected through connector 460 to the power source; a circuit breaker 462 is connected in that line. A power switching circuit connection terminal 466 provides power to a reversible-direction DC drive motor armature windings 470 and field windings 472.

The reversible-direction DC motor has separate connections into the power regulation circuit for the armature 470 and the field windings 472.

The windings of armature 470 of the DC motor are connected to the power regulation circuit at connectors 474, 476.

The field windings 472 of the DC motor are connected to the power regulation circuit at connectors 478, 480. Connection 480 is connected to ground 482.

The specific-open and common-close signals from the connectors 450, 452 are through 5 k-ohm potentiometers 484, 486 respectfully, allowing opening and closing speed of the doors to be uniformly adjusted.

Motor drive control signals control power transistor circuit means 490, 492, 494, 496, 498 (each including a transistor and diode as shown) to switch power to the armature and field windings of the DC motor so as to control direction of rotation for opening and closing. The direction of motor rotation is controlled by controlling the current path through the armature 470 between node (connector terminal) 466, node 500, and node 480 to ground 482. The current is subject to a resistor 502 (having a resistance of 1.5 ohms) and the field windings of the DC motor.

In order to open the door panels, the "specific-open" and "common-open" signals trigger transistor circuits 490, 492 to establish current from power supply connector 46 through "specific-open" transistor circuit 490, DC motor armature windings 470, "common-open" transistor circuit 492, field windings 472, and to ground 482 transistor circuits 494, 496 are not activated and do not conduct significant currents).

In order to close the door panels current is established oppositely in the armature; windings the "common-close" and the "specific-close" signals trigger transistor circuits 494, 496 (while transistor circuits 490, 492 are non-conducting). Current is established from power supply connector 466 through "common-close" transistor circuit 494, armature winding 470, "specific-close" transistor circuit 496, field winding 472, and to ground 482.

In order to slow the drive motor during opening or closing the drive motor braking signal line is energized, establishing current from power supply connector terminal 466, through braking transistor circuit 498, potentiometer 504, DC motor field windings 472, and to ground 482. The PLC alternates output signals between an opening or closing signal and a braking signal to control door panel speed.

For example, during braking to cushion opening "specific-open" transistor circuit 490, and "common-close" transistor circuit 494 are de-energized and act as one-way resistors with high values of resistance. This configuration establishes a current path from node 478, through resistance 502, collector to emitter diode of transistor circuit 496, armature windings 470, collector to emitter diode of transistor circuit 494, and to power supply connector terminal 466. Therefore rotation of the armature generates electrical power (partially dissipated by the resistance) which slows down armature rotation as its kinetic energy is converted into electrical energy. The PLC alternates signal pulses to the braking signal line and the "specific-open" signal line to establish a lower speed to cushion opening.

For a circuit which only cushions opening, either the "common-close" or the "specific-close" signal lines may be used for braking signals in order to reduce the number of such signal lines. Related "common-close" or "specific-close" transistor circuits such as 496 may be left in an energized state, during braking, which is of no concern since current flow through the diodes of transistor circuits 494 and 496 during braking of opening. Timing for start of such pulsing is determined by the PLC based on input from the "optic-cam" panel movement sensor.

In panel sensing circuit 296 of FIG. 7 signals are delivered to the PLC through wires 308, 310, 312, and 314 (in a cable as discussed previously) which are connected to the PLC from panel sensing circuit connectors 510, 512, 514, and 516. Wires 308 and 312 do not transmit control signals. Wire 308 provides 24 volt power for operation of the panel sensors; and, wire 312 is a common ground used by both the interface circuit and the panel sensing circuit.

The interface circuit is connected to the panel sensing circuit by wires 316, 318 and by a connector 342. The signals passing through the wires 316, 318 are used to provide local indication for the panel position sensors and the panel movement sensors, respectively, at a location near the motor drive. The trace going through connection 342 is the common ground for the interface circuit and panel sensing circuit.

These are two signal wires provided to carry panel sensing signals from the panel sensing circuit to provide feedback to the PLC. Signal wire 310 carries the optic cam (panel movement sensor) signal back to the PLC. Wire 314 carries the magnetic switch (panel position sensor) signal back to the PLC.

Power for the various panel sensors is provided by wire 308 through connector 510 to node (connector terminal) 518 which is the common power source for both the panel movement sensor 520 and the panel position (magnetic) sensors 522. Power for an optical radiation source for the movement sensor 520 is available from the common node 518 through a current limiting resistor 524 with a resistance of 2,000-ohms; and, through an LED 526 to the common ground 530. Power for the radiation detector of the optical movement sensor 528 is available from the common node 518 with the output signal being delivered to a connector 512 and transmitted back to the PLC; it is also transmitted to connector 332 on the interface circuit to provide indication near the drive motor for the panel movement sensor.

A magnetic sensor (flux line attenuation) can be used for the panel position sensor; power travels from common node 518 to the positive connector 536 of the first magnetic switch. When the first magnetic switch is closed current travels through the switch from the positive connector to the negative connector 538 of the magnetic switch. When the first magnetic switch is opened current is established through the 2K-ohm resister 540 and the indication LED 542 to ground 544.

A second magnetic position switch is connected to the first magnetic position switch in series when a motor drive moves two door panels. Power for the second switch travels from the negative connector 538 of the first magnetic switch to the positive connector 550 of the second magnetic switch. When both the first magnetic switch and the second magnetic switch are closed, current is established through the second magnetic switch from the positive connector 550 to the negative connector 553 of the second magnetic switch. When the first magnetic switch is closed and the second magnetic switch is opened current is established through the 2K-ohm resister 552 and the indication LED 554, and to ground 556.

The output signal from the magnetic switches travels through a connector 516 and is transmitted back to the PLC (not shown) through wire 314. The output signal from the magnetic switches also travels through wire 316 to a connector 330 of the interface circuit, to provide local sensor indication rear the drive motor.

Such magnetic sensors are available commercially and operation thereof is known in the art; other suitably accurate and durable sensors could be substituted for panel position sensing functions.

Figure 8:
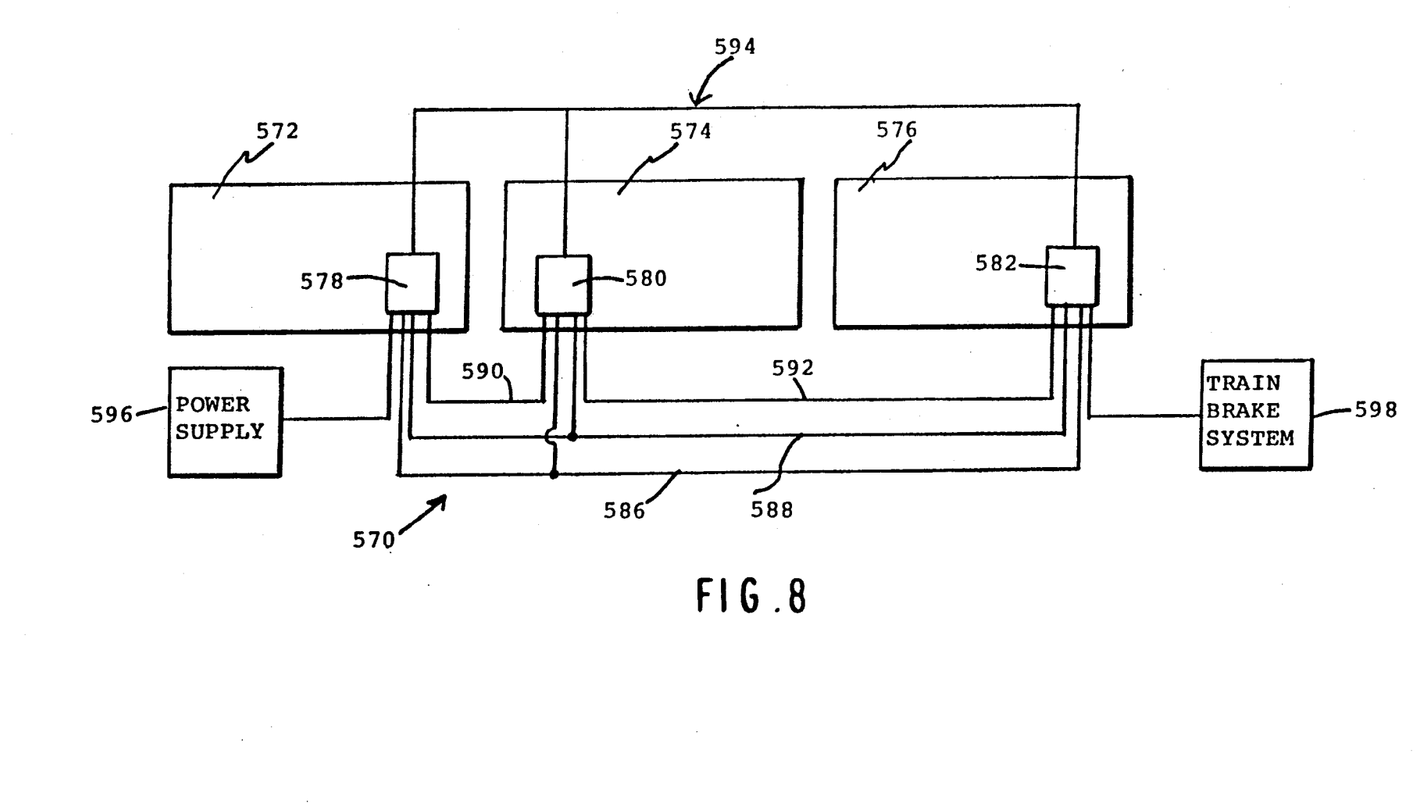
FIG. 8 is a schematic plan view of a multiple car embodiment of the invention with interconnection of programmable controllers for individual cars.

FIG. 8 is a schematic plan view of a multiple car embodiment of the invention showing the interconnections between individual cars of a train 570 which includes cars 572, 574, and 576. Each car contains its own PLC 578, 580 and 582, respectively, which are interconnected by various control cables 586, 588, 590, 592, and 594.

Control cable 586 comprises wires which transmit the commands for opening or closing all the doors on, e.g., the right side of the train. Control cable 588 comprises wires for transmitting all commands for opening all the doors on the remaining (left) side of the train.

Control cables 590, 592 comprise a single signal wire which runs in series from the power supply 596 between the PLC's 578, 580, 582, and to the release for rail movement of the train. This control line is used to prevent rail travel until all the train doors are closed. Each PLC has an input connection 114 and an output connection 116 for the rail motion release line (see FIG. 3).

Control line 594 is a network line between the PLC's. It provides for communication of problem conditions between the PLC's such that all the PLC's can display the location of any doorway problem in any car in the train. Control cable 594 could also be used to eliminate the need for the other above described control lines.

Figure 9:
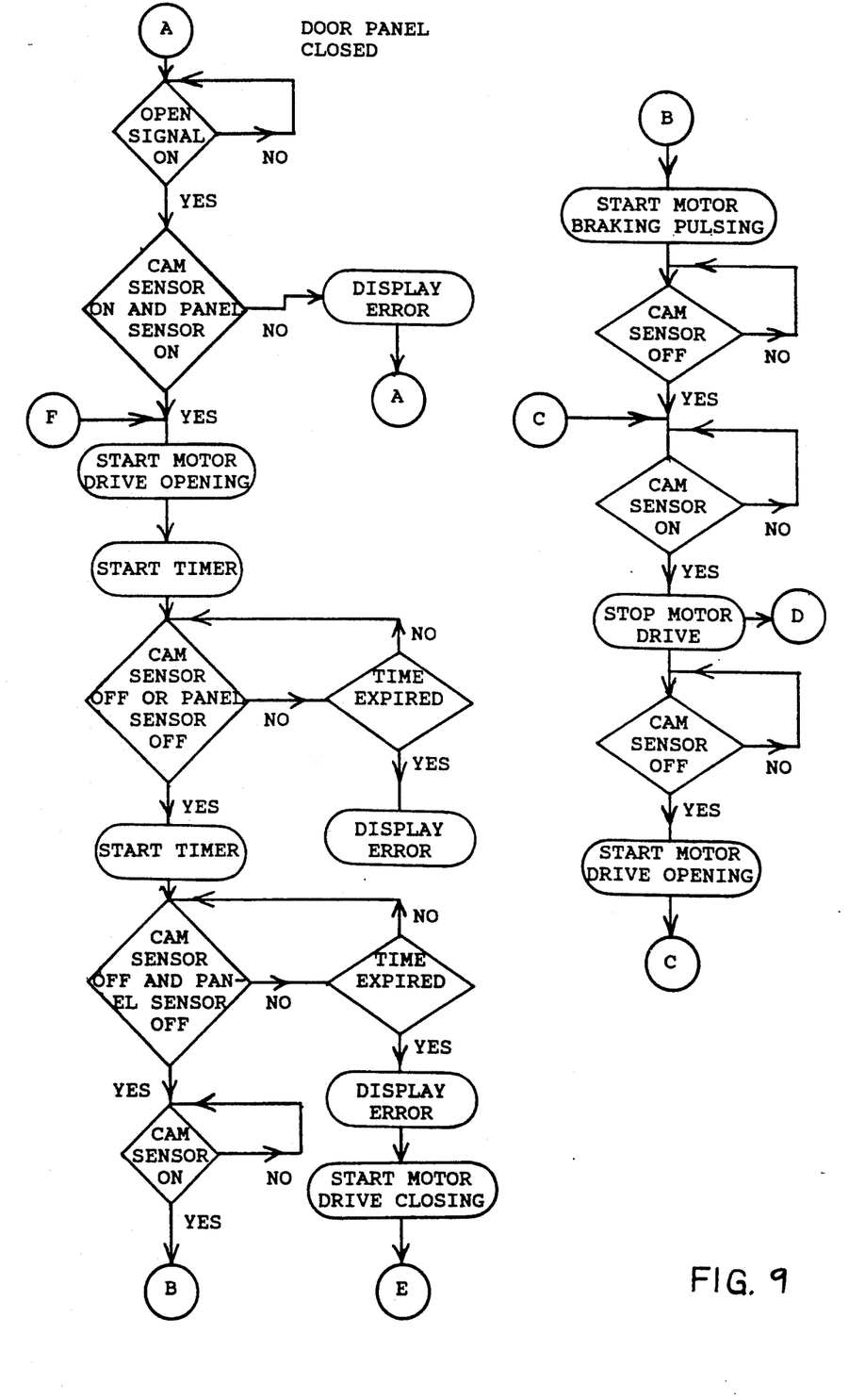
FIG. 9 is a flow chart of the opening sequence for a transit car door program of the invention.
Figure 10:
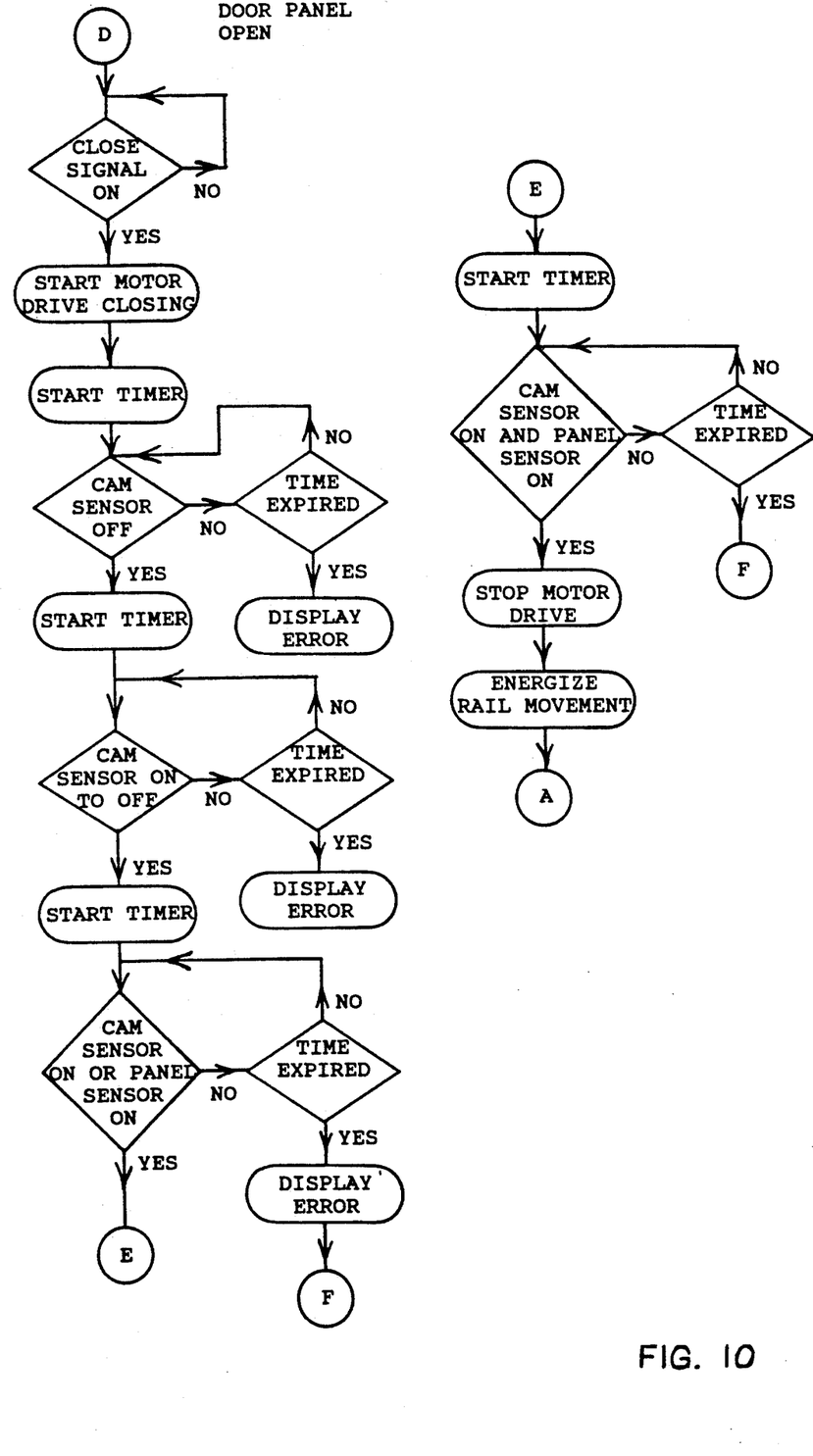
FIG. 10 is a flow chart of the closing sequence for a transit car door program of the invention.

The integrated program for the PLC's of the invention is subdivided for purposes of illustration only into opening sequencing of FIG. 9 and closing sequencing of FIG. 10.

Operation and functions of components combined by the present invention have been set forth in relation to prior Figures for purposes of describing novel concepts of the invention; and, the interrelation of function brought about by the PLC program of the invention has been set forth in such description.

The flow sheets of FIGS. 9 and 10 are for purposes of setting forth such interrelation in sequence. However, in view of the earlier description such flow charts as illustrated are substantially self-explanatory and do not require extended repetition of text.

It should be noted that the panel movement sensor is referred to in the flow charts as a cam sensor and the position sensor is referred to as a panel sensor.

Figure 11:
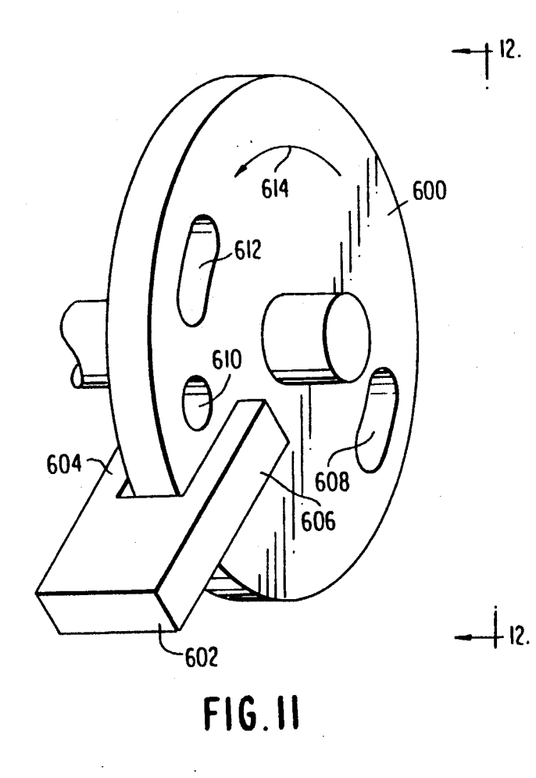
FIG. 11 is a perspective view of a specific embodiment of apparatus, forming part of the invention, for evaluating door panel movement.
Figure 12:
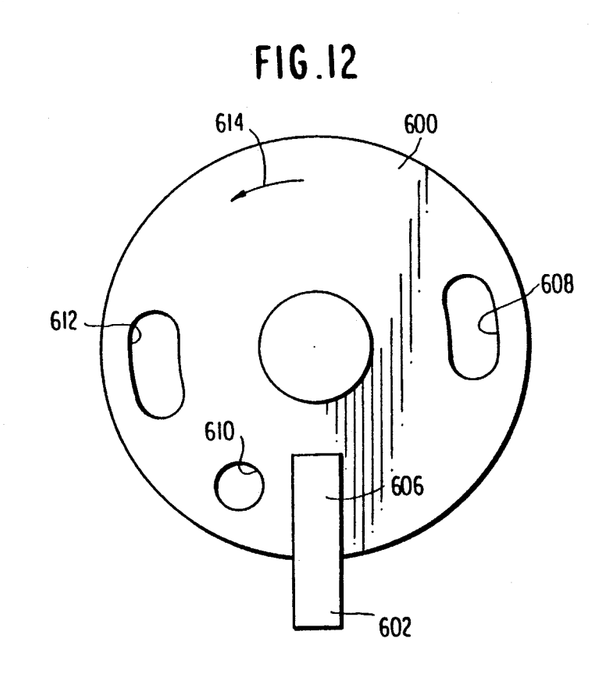
FIG. 12 is a plan view of a rotor portion of the apparatus of FIG. 11.

The panel movement detector (cam sensor) is shown as FIG. 11 with a detailed view of the rotor shown in FIG. 12.

The cam sensor is used to time normal opening and closing of the door panel means and to time initiating of motor braking pulses.

Referring to FIG. 11, rotor 600 rotates in coordination with its motor drive between a saddle block 602 presenting a radiation emitter 604 and radiation detector 606.

Rotor 600 is opaque to such radiation and includes signaling apertures 608, 610 and 612.

Arrow 614 indicates opening rotation direction. Upon proper start of opening movement, aperture 608 starts timing a normal opening cycle, as well as the normal time to reach aperture 610; both can be timed in the PLC.

At aperture 610, brake pulsing of the motor drive starts; and at aperture 612, opening is completed and the motor drive is stopped.

The closing cycle can use such apertures to determine normal closing time; and, to time motor drive braking, if desired for the closing sequence.

Specific circuit element values have been set forth; availability of other parts is as follows:
Power Transistors-KE721KA1 available from POWEREX, a joint venture corporation of WESTINGHOUSE and GENERAL ELECTRIC Co.
Saddle 602-OPTEK OPB824A (formerly a TRW) Carrollton, Tex. 75006
Magnetic Sensor-TURCK Ni20-CP40-VP4×2 TURCK U.S.A. 3000 Campus Drive Minn., Minn. 55441
Motor Drive-
WESCODE Model V21NO39 #WC 15124-001
WESCODE Gearbox-Model WD15235/001
available from WESCODE Inc. 90 Great Valley Parkway Frazer, Pa. 19355

While specific circuit values and parts have been identified for purposes of setting forth a specific preferred embodiment, it should be understood that other values and parts can be used in the light of the above teachings; and, that the scope of the present invention is to be determined by the appended claims.

We claim:

1. A cam control system for controlling the opening and closing movements of a transit car door panel comprising:
   at least one transit car door panel,
   drive means connected to the transit car door panel for producing opening and closing movements of the transit car door panel;
   a cam device including: (a) a source of radiant energy, (b) a radiant energy detector spaced from the source of radiant energy to provide a gap therebetween, (c) attenuating means located for mechanical movement through the gap, and (d) means for producing an electrical output signal responsive to the radiation energy received by the detector as attenuated by the attenuating means,
   means coordinating the mechanical movement of the attenuating means with the drive means,
   the attenuating means including coding means for producing multiple output signals, one of the output signals produced by the coding means being indicative of the normal time to complete movement of the transit car door panel, and
   controller means connected to receive the output signals and connected to the drive means for controlling the opening and closing movements of the transit car door panel.

2. The cam control system of claim 1 wherein:
   the multiple output signals produced by the coding means further include a signal indicative of the start of movement of the transit car door panel, and
   a signal indicative of the completion of the movement of the transit car door panel.

3. The cam control system of claim 2 wherein the controller means is connected to receive the output signals indicating the start of movement of the transit car door panel and the completion of movement of the transit car door panel, and
   the controller means includes timing means and means for initiating pulse braking of the drive means when the controller means receives the signal indicative of the normal time to complete movement of the transit car door panel.

4. The cam control system of claim 1 wherein:
   the attenuating means comprises a rotor composed of a material opaque to the radiant energy, and
   the coding means comprises at least three apertures in the rotor.

5. A cam indicator system for indicating the opening and closing movements of a transit car door panel comprising:
   at least one transit car door panel,
   drive means connected to the door panel for opening and closing the door panel,
   a cam device,
   the cam device including: (a) a source of radiant energy, (b) a radiant energy detector spaced from the source of radiant energy to provide a gap therebetween, (c) attenuating means located for mechanical movement through the gap, and (d) means for producing an electrical output signal responsive to the radiation energy received by the detector as attenuated by the attenuating means,
   means coordinating the drive means in opening and closing the door panel with the mechanical movement of the attenuating means,
   display means for indicating the opening and closing movements of the door panel, and
   circuit means connecting the electrical output signal from the cam device to the display means for indicating the opening and closing movements of the door panel.

* * * * *